July 12, 1966   R. H. DAMON, JR., ET AL   3,260,321
DUAL CAPACITY SCALE WITH DISENGAGEABLE COUNTERWEIGHT
ON LOAD TRANSMISSION ROD
Filed April 21, 1964                      4 Sheets-Sheet 1
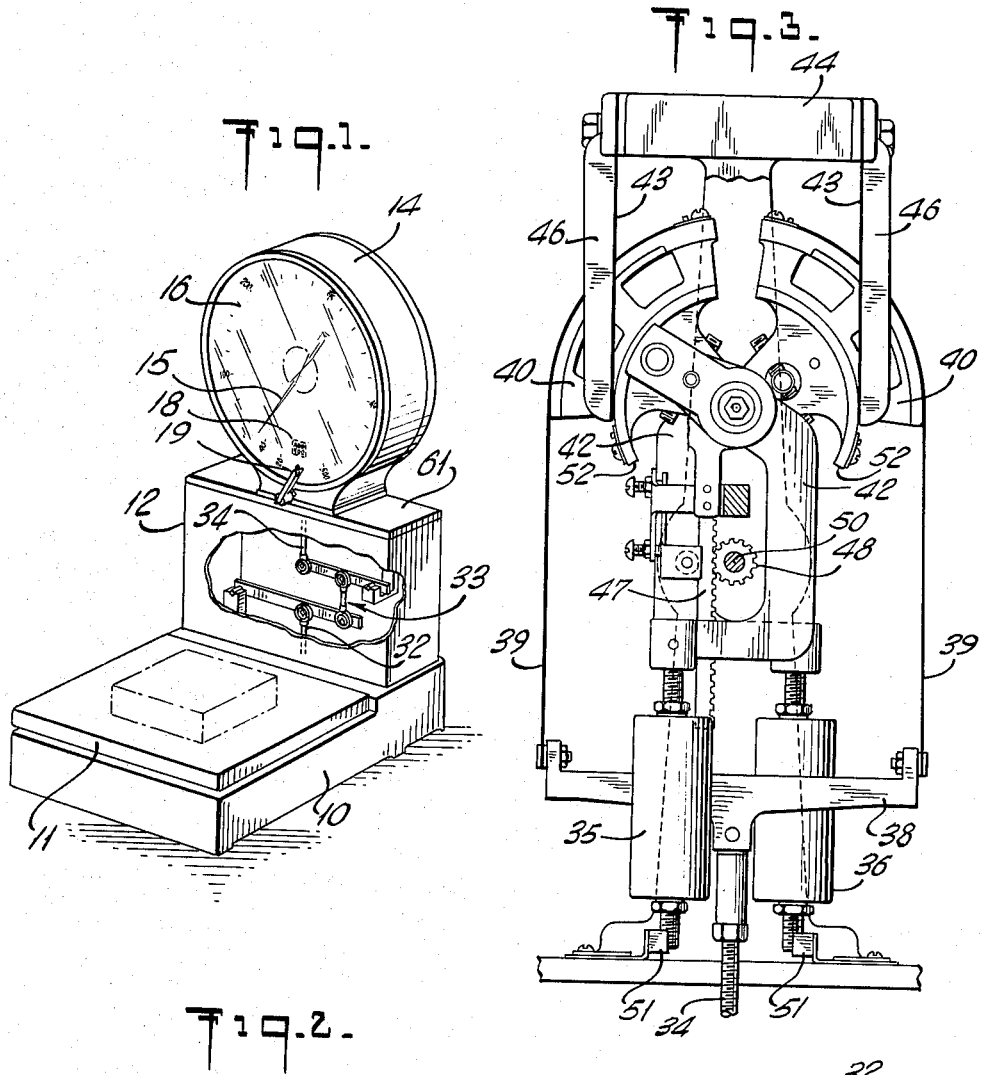
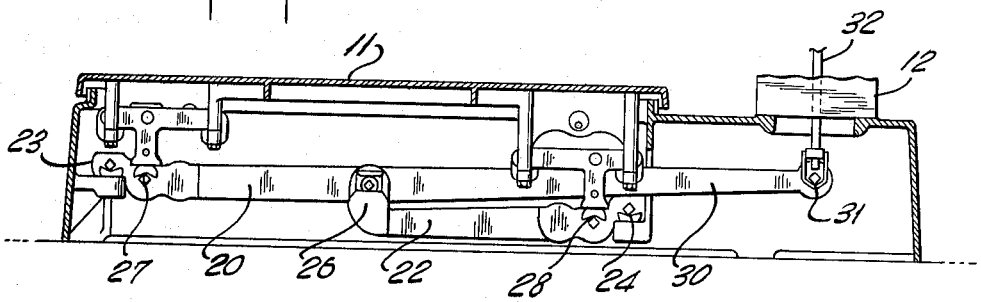
INVENTORS
ROGER H. DAMON, JR.
JOHN B. ROLFE
BY George A. Woodruff
ATTORNEY

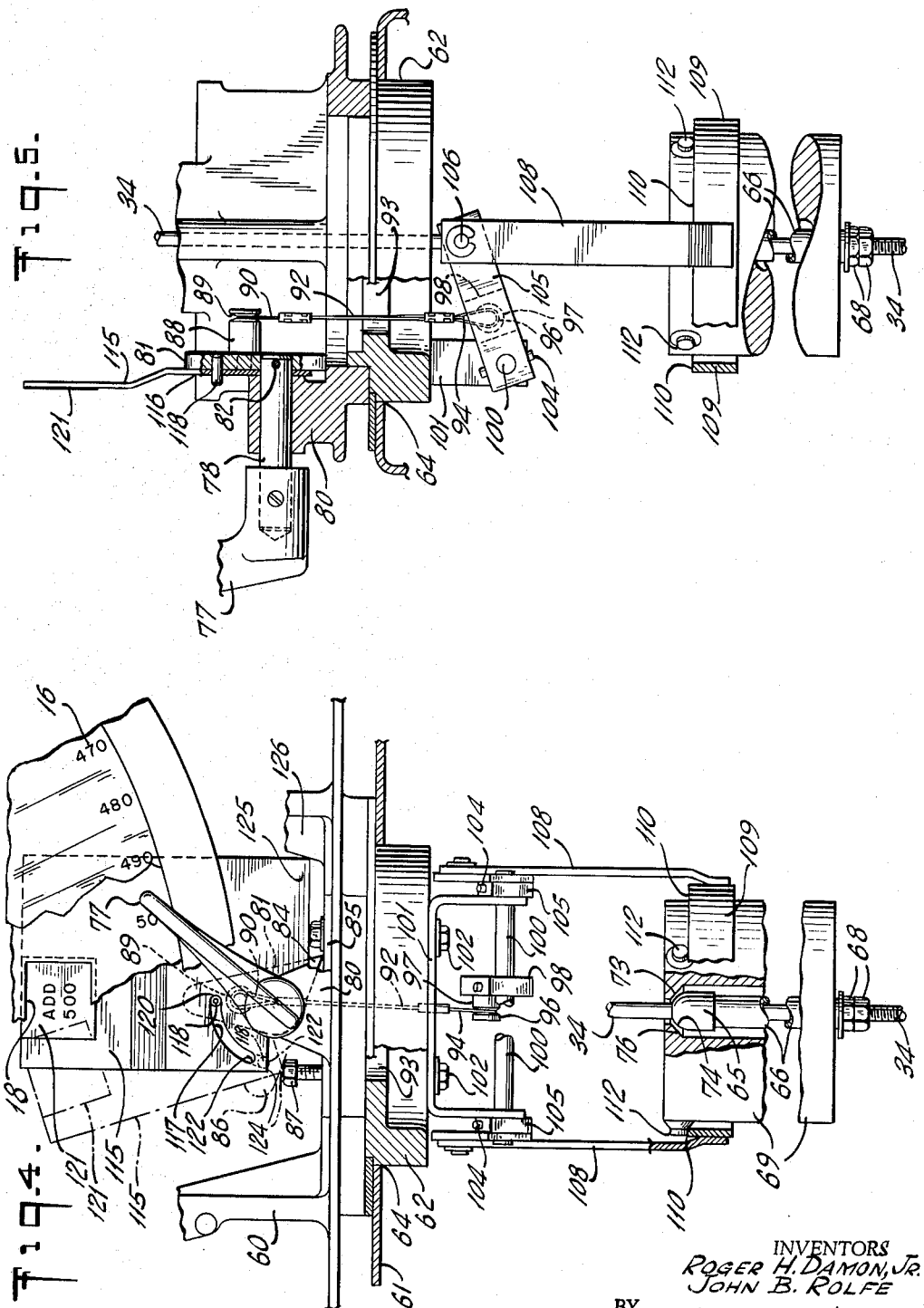

INVENTORS
ROGER H. DAMON, JR.
JOHN B. ROLFE
BY George A. Woodruff
ATTORNEY

July 12, 1966  R. H. DAMON, JR., ET AL  3,260,321
DUAL CAPACITY SCALE WITH DISENGAGEABLE COUNTERWEIGHT
ON LOAD TRANSMISSION ROD
Filed April 21, 1964  4 Sheets-Sheet 4
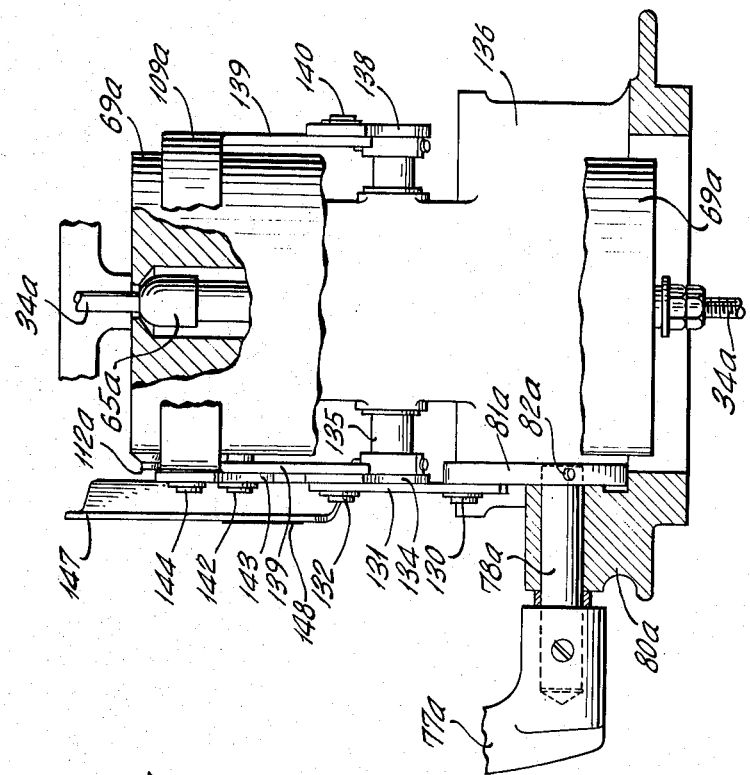
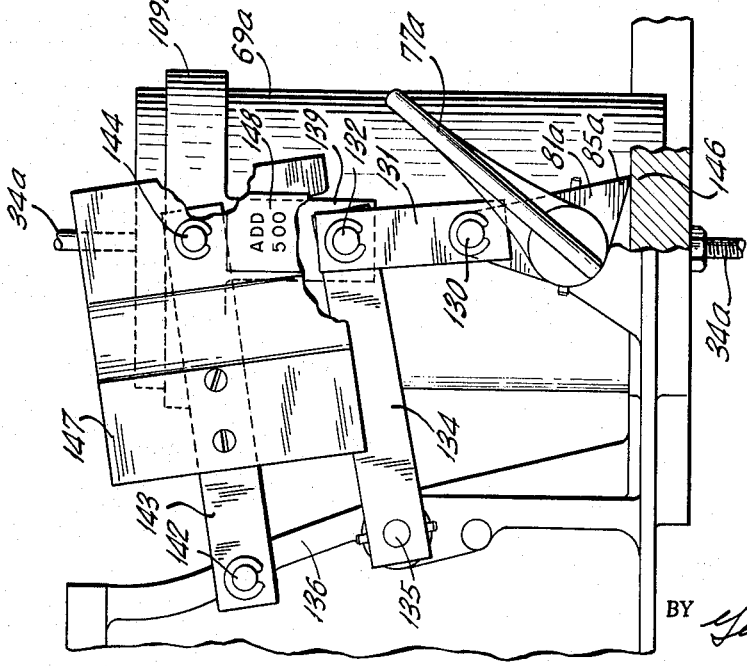
INVENTORS
ROGER H. DAMON, JR.
JOHN B. ROLFE
BY George A. Woodruff
ATTORNEY

United States Patent Office 3,260,321
Patented July 12, 1966

3,260,321
DUAL CAPACITY SCALE WITH DISENGAGEABLE COUNTERWEIGHT ON LOAD TRANSMISSION ROD
Roger H. Damon, Jr., and John B. Rolfe, both of St. Johnsbury, Vt., assignors, by mesne assignments, to Fairbanks Morse Inc., New York, N.Y., a corporation of Delaware
Filed Apr. 21, 1964, Ser. No. 361,368
8 Claims. (Cl. 177—176)

This invention relates to improvements in weighing scale apparatus, and more particularly to novel capacity increasing means suitable for dial type scales and the like.

As is well known and conventional in the scale art, pendulum type counter-balancing mechanism having dial indicators, generally are subjected to two applied loads. The first is known as a dead load or zero pull force imposed on the mechanism by the scale lever system in the no-load condition, and that force is counter-balanced by the pendulum means to bring the dial indicator to the dial face zero weight mark position. The second applied force is generally called the calibration pull, being predetermined in the design of the mechanism as that force which when counter-balanced by the pendulum means, results in location of the dial pointer at the capacity weight mark on the dial face. As for the value of capacity weight on the dial, such figure is determined according to the ratio of the scale lever system, being the product of the lever ratio and the calibraton pull force. Thus, in a scale having a 40:1 lever ratio and a calibration pull of 12½ pounds, the base capacity of the dial indicator will be 500 pounds.

In weighing apparatus of the kind indicated, the dead load or zero pull force is considerably less than the calibration pull force, generally being in the vicinity of ¼ to ½ the value of the latter. Such zero pull is produced by proper design and arrangement of the scale lever system, and is thus a built-in force in a given dial scale apparatus, which at scale no-load is balanced by the dial pendulum means to locate the dial pointer at zero weight reading.

According to the present invention and as an object thereof, weighing apparatus having a basic weight indication capacity as above outlined, is adapted and arranged to afford a weighing capacity beyond the initial or base capacity, through control of the indicated zero pull force in a novel manner hereinafter to appear.

Another object is to provide in weighing apparatus of the character indicated, means presenting an auxiliary force normally effective with the built-in zero pull force of the scale lever system to impose a total zero force greater than the noted calibration force and which is counter-balanced by the pendulum means with the dial indicator at zero weight indication in the no-load condition of the scale lever system, and control means for rendering the auxiliary force means ineffective and thereby conditioning the weighing apparatus for weighing response to scale loading in a range above the base capacity of the dial indicator, with the dial indicator then indicating the excess of load weight over the base capacity load weight.

Another object resides in the provision for weighing apparatus adapted as indicated in the foregoing object, of indicator means which upon operation of the control means to render the auxiliary force means ineffective, indicates a weight value which in summation with the dial weight indication provides the indication of load weight on the lever system.

The foregoing and other objects and advantages of the present invention will appear from the following description of embodiments thereof as exemplified in the accompanying drawings wherein:

FIG. 1 illustrates a platform dial scale to which the present invention is applied;

FIG. 2 is an enlarged longitudinal sectional view of the platform and scale lever system;

FIG. 3 is an enlarged sectional view of the counter-balancing dial head mechanism;

FIG. 4 is an enlarged view, partly in section and in elevation, of one embodiment of the presently improved scale capacity control provision;

FIG. 5 is a similar view, but taken at a right angle to that of FIG. 4;

FIG. 10 is a view of another embodiment of the capacity control provision, and

FIG. 11 is a further view of the device of FIG. 10.

Figure 6:
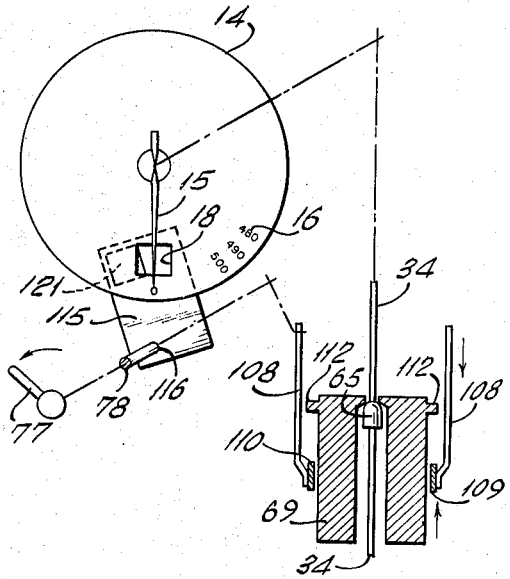
FIGS. 6 and 7 illustrate diagrammatically the relationship of the capacity control parts shown by FIGS. 4 and 5, respectively under scale no-load and near-maximum load conditions in the base capacity range of the apparatus.

The capacity increasing provision hereinafter to be described is applicable to various forms of lever system weighing apparatus and particularly those having automatic counter-balance indicator mechanism. For the purpose of present example, the invention is applied to a platform type dial scale as of the form shown in FIG. 1. The scale illustrated includes base frame 10 containing the scale lever system supporting the load platform 11, an upright tare housing 12, and a counter-balance dial indicator mechanism casing or head 14 on housing 12 and capable of 360° swivel movement for viewing from any direction. Dial head 14 provides the indicator pointer 15 movable over weight chart 16, a chart window 18 for capacity increase indication, and a manual control or handle 19 for operating the capacity increasing provision of the present invention.

FIG. 2 illustrates the platform and lever system of the scale according to FIG. 1. This system is generally of conventional or well known type, providing a pair of levers 20 and 22 pivotally carried by the base frame 10 at the respective pivot support points 23 and 24. These levers pivotally coupled at 26, support the scale platform assembly 11 at pivot points 27 and 28. Lever 20 further has a rigid or integral extension 30 to the free end of which is connected as by pivot unit 31, the lower end of steelyard rod 32. Rod 32 which extends into the tare housing 12, is coupled in known manner (as by the pivotal lever assembly indicated at 33 in FIG. 1) to the load rod 34 (FIGS. 1 and 3) of the counter-balance indicator mechanism 14.

Referring now to FIG. 3, the counter-balance indicator mechanism within head 14 is of known form, here being of double pendulum type providing the pendulum weights 35 and 36. Although the structure of the mechanism shown is well known, it is here noted that the load rod 34 which with lever means 33 in housing 12 and the steelyard rod 32 (FIG. 2) couples the scale platform lever system to the counter-balance mechanism, is connected to a cross bar 38. The bar 38 in turn is connected at its ends by tapes 39 to the pendulum supporting sectors 40 each of which supports its pendulum through an arm 42. Each sector is suspended by tape 43 from the upper mechanism frame part 44, and these sectors respond to load pull on rod 34 by upward angular movement in contact with the guides 46. Such sector movement results in outward swing of the pendulums to positions counter-balancing the load pull, the pendulums here crossing each other from the no-load positions shown in FIG. 3. Sector drive to the dial pointer 15 (FIG. 1) is effected through rack 47 in driving engagement with pinion 48 on the pointer shaft 50. As is customary in mechanisms of this kind, pendulum stops 51 are provided for limiting pendulum movements in the direction to produce a behind-zero displacement of the dial pointer 15. Also, the lower ends 52 of the sectors serve by relative abutment on maximum outward swing of the pendulums, to limit dial pointer movement beyond the capacity graduation of the dial chart.

Considering the weighing apparatus as so far described, the platform lever system in the no-load condition (without load on the platform) produces a so-called dead load pull on the load rod 34. The amount of such pull, measured in pounds for example, is predetermined by design of the lever system, and that pull is counter-balanced by the pendulum mechanism so that the dial pointer 15 then will be at the zero indicia mark of the dial chart. For a given dial capacity scale, the pendulum mechanism is selected and adjusted in relation to the lever system ratio, such that upon capacity loading of the scale platform the pendulums will swing to positions counter-balancing the load and with the dial pointer then at the chart capacity weight indicia or graduation. The pull force on the load rod 34 (above that of the dead load pull) required to effect this result, is generally called the calibration pull. Assume for example, that the scale here illustrated is provided to have a dial capacity of 500 pounds and a lever system ratio of 40:1. The calibration pull force therefore will be 12½ pounds, required on scale loading at 500 pounds to bring the indicator pointer to the capacity (500 pounds) graduation of the chart.

In weighing apparatus as shown, the conventional practice is to adapt the lever system for a dead load pull materially less in value than the calibration pull, as in the range of about ¼ to ½ the calibration pull force. Such dead load force in the present example, may be 6 pounds reflected as a pull on the counter-balance mechanism load rod 34. Now in accordance with this invention, it is found that the weighing capacity of the scale apparatus may be increased beyond the given dial capacity, by relatively simple and effective means in application either to the lever system or, conveniently as herein shown, to the load rod 34 of the counter-balance mechanism. The means herein contemplated is such as to impose a pull force on rod 34 which in addition to the lever system dead load pull, results in a total pull force greater than the calibration force of the counter-balance mechanism. This additional force is made effective throughout use of the weighing apparatus in weighing loads within the base capacity of the counter-balance indicator, as up to the dial chart capacity limit. For weighing loads greater than the base capacity of the dial indicator, the additional force is rendered ineffective which conditions the apparatus for weighing such loads up to a maximum determined according to the force value of the then removed additional force.

For example, assume a 500 pound base capacity scale wherein the lever system ratio is 40:1, the dead load pull of the lever system is 6 pounds and the calibration pull is 12½ pounds. Now if the additional force say applied to the load rod 34 of the indicator, is equal to the calibration pull, as 12½ pounds, the total pull on the rod will be 18½ pounds at no-load of the lever system. Under these conditions and with the indicator mechanism adjusted so that such total pull locates the indicator pointer 15 at the zero graduation of the chart, the apparatus will weigh and indicate up to 500 pounds (the base capacity). It will be appreciated that the added pull of 12½ pounds on rod 34 is, by reason of the lever system ratio, equivalent to 500 pounds weight on the scale platform, such equivalent weight being herein and in claim definition termed a reference load weight. Accordingly, with 500 pounds on the platform and the added 12½ pound pull force now removed from rod 34, the counter-balance indicator mechanism will respond to bring the indicator pointer back to the zero graduation of the chart. Thereupon, more weight may be placed on the scale platform and the dial indicator will show the weight excess over the base capacity, the additional capacity limit under the given conditions being equal to the reference load weight of 500 pounds. Adding the reference load weight (base capacity value in this instance) and the dial reading then gives the weight on the scale.

Where the additional pull force on rod 34 is selected at a value less than the calibration pull of the indicator mechanism, in the above example, the additional weighing capacity will be proportionately less. For instance, assume a 10 pound force on rod 34, equivalent to a reference load weight on the lever system of 400 pounds. Such added force together with the dead load pull of 6 pounds will effect a 16 pound pull at no-load of the scale. The indicator mechanism adjusted to utilize this total pull in locating the pointer at chart zero position, then will indicate loads up to the 500 pound chart capacity. Now with 500 pounds on the scale platform and the added 10 pound force removed from rod 34, the indicator pointer will drop back to a reading of 100 pounds (500 pounds less than 400 pound reference load weight equivalent of the added 10 pound force). The scale will now accept additional scale loads up to 400 pounds, or a total of 900 pounds which is the sum of the reference weight and the maximum dial reading of 500 pounds.

In each case of the above two examples, a means for separately indicating the reference weight to be added to the dial reading for obtaining the total weight on the scale, is incorporated for ready observation. In the first example, such means would show 500 pounds in the increased capacity condition of the apparatus, while in the second example the means would show 400 pounds.

Turning now to one form of the present capacity increasing provision, such is illustrated by FIGS. 4 and 5. The dial mechanism head unit 14 (FIG. 1) has its base portion 60 mounted on the top wall 61 of the tare housing 12 by a clamp ring 62, the latter extending through opening 64 in wall 61. The mechanism load rod 34 extends downwardly through the clamp ring into housing 12, being therein connected by the lever means 33 (FIG. 1) to the steelyard rod 32 of the scale lever system. In the mounting arrangement illustrated, the dial head unit with its clamp ring 62 is free to be turned to any position within a full 360° turn to facilitate dial reading in any desired direction. Carried by the rod 34 is an abutment or support element 65 which is adjustable vertically along the rod as by a mounting collar assembly 66 positionally adjustable through nuts 68. Normally supported on the rod 34 through element 65 is a weight element 69 which provides the additional force hereinabove referred to. The weight element conveniently of cylindrical form, has a central bore 70 receiving rod 34 therethrough, and is formed adjacent its upper end portion to present a bore shoulder 73 for seating of the weight element in suspension from the rod. Advantageously, the upper surface 74 of element 65 is semi-spherical and the seating surface 76 of the weight shoulder 73 has a corresponding spherical curvature. Thus the weight element when supported on the element or support 65, will be self-adjusting on the support to assume a desirable vertical suspension position.

Control of the application and removal of the weight element 69 relative to rod 34, is effected in the present example by manually operated means. Such means here includes a control handle 77 conveniently located externally near the lower end of the dial head 14 (FIG. 1) and fixed on a shaft 78 rotatably carried in portion 80 of the dial head base 60 (FIG. 5). The shaft at its inner end within the dial head has a crank arm 81 fixed thereon as by a pin 82, the arm being swingable by the handle either to the upright position shown wherein a projecting toe 84 of the arm abuts the portion 85 of the dial head base 60 or to the opposite position wherein the outer end 86 of the arm abuts an adjustable stop screw 87 (FIG. 4). Extending laterally from the crank arm in support thereon, is a stud 88 having an annular recessed seat 89 near its free end to receive the upper loop end 90 of a cable element 92. The cable extends downwardly through opening 93 in a clamp ring 62, and has its lower loop end 94 seated in recess 96 of a similar stud 97 carried by an arm 98 fixed on a shaft 100. The shaft 100 is rotatably carried by a bracket 101 supported by screws 102 from the underside of clamp ring 62. Fixed to each end of shaft 100 as by a pin 104, is an arm 105, both arms extending in the direction of rod 34 (FIG. 5). Freely pivoted at 106 to the outer ends of the arms 105 are suspension links 108 which are attached to an annular member of ring 109 encircling the weight element 69. The ring 109 having an internal diameter appreciably greater than the diameter of the cylindrical weight element so as to avoid lateral contact with the element, provides an upper marginal surface 110 for engagement with stud-like lateral projections 112 carried by the upper end portion of the weight element.

Figure 7:
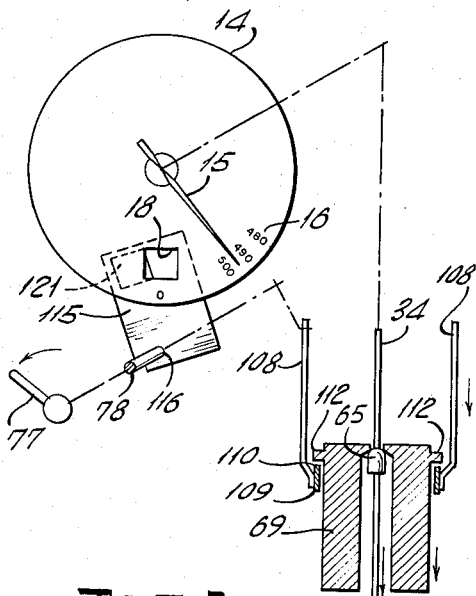

It will be observed that the control in the solid line position of handle 77 as shown in FIG. 4, is actuated to dispose the ring 109 in its elevated position engaging the weight projections 112 and thereby suspending the weight element free and clear of the rod abutment 65. However, considering first the normal position of the weight element in the base capacity weighing range of the scale apparatus, such is illustrated by the diagrammatic views of FIGS. 6 and 7. As shown in FIG. 6, the handle 77 is moved to its opposite position from the position shown in FIG. 4, so that the arm 86 rests on stop screw 87 (FIG. 4). This effects a lowered position of the ring 109 clear of the weight studs 112, thus permitting full support of the weight element 69 on the load rod abutment 65. In the view of FIG. 6 the weight element occupies a substantial elevated position relative to the ring 109. This is the normal relation of the parts in scale balance at no-load on the lever system and with the indicator mechanism pointer 15 at dial zero position, to allow for downward displacement of the rod and weight in scale loading within its base capacity range as up to 500 pounds in the present example. FIG. 7 illustrates the condition under scale loading of 495 pounds, represented by the position of pointer 15 on the dial scale. As there shown, the rod and weight are lowered to a point where the weight studs 112 are relatively near the ring 109, and these studs will be clear of the ring to a desirable minimum extent in full base capacity scale loading to 500 pounds.

Figure 8:
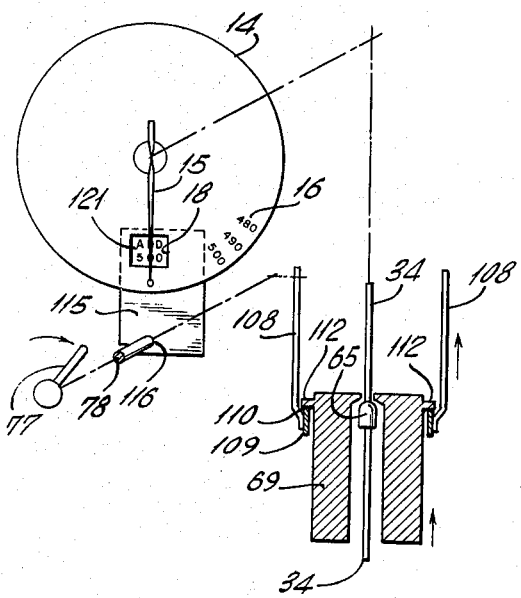
FIGS. 8 and 9 are diagrammatic views similar to those of FIGS. 6 and 7, but illustrating the control parts relationship under increased capacity conditioning of the apparatus.
Figure 9:
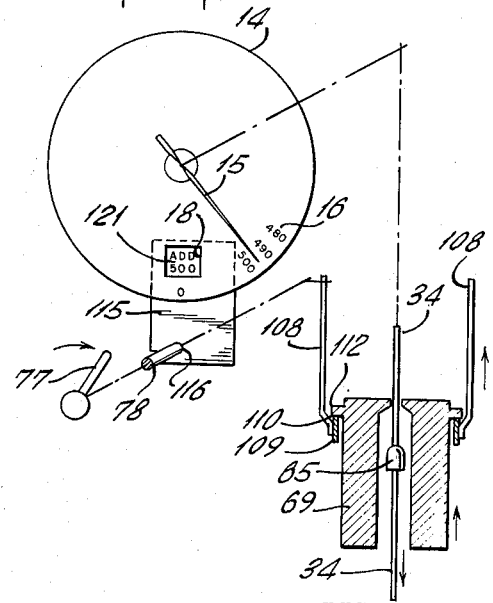

To increase the scale capacity, the handle 77 is moved to the position shown in FIG. 4, this movement resulting in crank arm lift of the cable 92 which through arm 98 turns shaft 100 to rotate the arms 105 and lift links 108. Elevation of the links thereby elevates ring 109 and through ring engagement with weight projections 112, effects a corresponding upward displacement of the weight element 69 from its seat on the abutment 65 of rod 34 to a position free of the rod. The weight thus removed and carried by the ring 109 so that it is then ineffective relative to the rod 34, thereby conditions the scale apparatus for weighing loads above its base capacity. The increased capacity relationship of these parts is illustrated in the diagrammatic views of FIGS. 8 and 9. As shown in FIG. 8, the weight element 69 is suspended on ring 109 free of the rod abutment 65, and the position of the rod 34 and abutment 65 is that obtaining with a 500 pounds load on the scale lever system. In such condition and as hereinabove described, the counter-balance indicator mechanism effects balance of that load with the indicator pointer 15 then at the dial zero position. FIG. 9 illustrates the relation of these parts under near maximum increased capacity loading of the scale lever system. The dial pointer 15 is shown opposite the 495 pound graduation on the dial scale, so that with the reference load weight (here 500 pounds) the total weight of the load is 995 pounds.

The elevated position of the weight element clear of rod 34 is here maintained so long as handle 77 remains in the position shown in FIG. 4, by an overcenter relation of the crank arm cable connection to the lifting mechanism arm 98. As appears in the position of the crank arm shown (FIG. 4), the crank arm stud 88 disposes the cable 92 such that its longitudinal axis is at one side of the handle shaft axis, as to the left thereof as viewed in FIG. 4. The then elevated weight acting through the lifting mechanism, thus tends to turn the crank arm in the clockwise direction, but such turning is arrested by abutment of the crank arm toe 84 with the dial head base portion 85. Hence, the weight will remain elevated so long as handle 77 is in the illustrated position.

Provision is here included for indicating the weight value to be added to the scale dial reading when the scale apparatus is in increased capacity condition, i.e. when the weight element 69 is in elevated position free of the rod 34. A flag member 115 is freely pivotally mounted at one corner region 116 thereof on the handle shaft 78, and formed in such corner region is an arcuate slot 117 which receives a pin 118 carried by the crank arm 81. The flag slot is on a radius from the center of the handle shaft 78, and its length in relation to the full travel distance of the pin 118 between the opposite positions of the handle 77, is such as to effect flag location as follows. When the handle 77 is moved to the position shown in FIGS. 4, 8 and 9 for increased scale capacity, crank arm pin 118 engages the end 120 of the slot and pivots the flag to the upright position shown in solid lines (FIG. 4). In that position of the flag, an indicia bearing area 121 thereof (showing the reference load weight to be added to the dial reading) registers with the dial chart window 18 (FIGS. 1 and 4). Now, when the handle 77 is located in the opposite position (FIGS. 6 and 7) the crank arm pin 118 engages the opposite end 122 of the flag slot and moves the flag to displace the flag indicia area 121 from the chart window 18, thus removing the reference weight indicia from view in the window. The pin holds the flag displaced to a suitable extent in this instance, by retaining the flag with its lower corner 124 against a suitable stop which in the present example may be the stop screw 87. In its upright position, the flag is retained by the pin 118 holding the flag corner 125 against a stop which may be a part of the dial head base portion 60, as the base part 126.

It is to be observed from the foregoing description of the control embodiment shown by FIGS. 4 and 5, that the control mechanism is entirely supported by the base 60 and clamp ring 62 of the dial head unit 14. Hence, this mechanism will turn with the head unit when the latter is turned for convenient dial reading in any desired direction within a 360° turn, so that turning of the dial head will not disturb the operativeness of the mechanism.

FIGS. 10 and 11 illustrate a second embodiment of the present capacity increasing control provision, this form of the mechanism being particularly suitable for location wholly within the lower portion of the dial head unit 14. The elements hereof which are substantially the same as those of the first described embodiments are, for convenience, given the same reference characters but differentiated by the letter "a."

The handle 77a and its shaft 78a are located on the head 14 in the same position as in the first embodiment, and secured to the inner end of the shaft by pin 82a is a similar crank arm 81a movable by the handle to and between opposite positions as before. Pivoted to the crank arm at 130 is a link 131 which extends upwardly to pivoted connection at 132 with one end of a bar 134. The other end of bar 134 is suitably secured to one end of a rock shaft 135 rotatably mounted in frame part 136 of the dial head unit. Similarly secured to the opposite end of shaft 135 (FIG. 11) is a like bar 138 which extends parallel to bar 134. Encircling the weight element 69a is the lift ring 109a, the ring having a diametrically opposite pair of depending arms 139 secured thereto so as to be rigid with the ring. The lower ends of these arms are pivotally connected one at 140 with the outer end of bar 138 and the other by the link pivot 132 to the bar 134. Above the bar 134 and pivoted at 142 to frame part 136 is a third bar 143 which has its outer end pivotally connected at 144 to the ring 109a. This third bar 143 cooperates with bar 134 in connection thereof to the ring 109a, as essentially a parallel linkage arrangement, to obtain straight line vertical movements of the ring 109a in actuation of the mechanism.

With the parts in the positions shown in FIGS. 10 and 11, the weight 69a is elevated from support on the abutment 65a of rod 34a (corresponding to the position of parts as in FIG. 4). That position is maintained due to the overcenter relation of the link pivot 130 with respect to the axis of handle shaft 78a, the force of the elevated weight urging the crank arm toe 85a against the stop provided by the dial head frame part 146. Also, carried by the upper bar 143 is a flag plate 147 having the reference load weight indicia area 148, the plate in the position of the parts as shown having the indicia area exposed at the chart window 18 (FIG. 1). It will be appreciated now that upon rotation of handle 77a to its opposite position, the linkage will lower the weight onto the rod abutment 65a, and displace flag 147 downwardly to remove the indicia area 148 from view in window 18. Here again, since the capacity increase control mechanism is carried wholly by the dial head, rotation of the latter will not alter the effectiveness of the mechanism.

Having now described the present invention and illustrated the same according to now preferred embodiments, it is to be understood that various alterations and modifications may be made therein without departing from the scope of the invention as hereinafter claimed.

What is claimed is:

1. In weighing apparatus having a load responsive lever system, a counter-balance indicator mechanism and coupling means operatively connecting the mechanism and lever system, said lever system being adapted and arranged to produce in the no-load condition thereof an unbalance force of given force value in the coupling means, force means of predetermined force value normally connected to the coupling means for increasing said unbalance force to a predetermined total unbalance force value, said counter-balance indicator mechanism being adapted and affording the sole means to counter-balance said total unbalance force value in the no-load indicating condition of the mechanism, and operating responsively to lever system loading to indicate load weight up to a predetermined maximum weight value defining the initial capacity limit of the weighing apparatus, and means operable to disconnect said force means from the coupling means, thereby conditioning said counter-balancing indicator mechanism for weight indication upon lever system loading in a range above said initial capacity limit.

2. In weighing scale apparatus, a load responsive lever system, a counter-balance indicator mechanism, coupling means connecting the lever system and mechanism, the lever system in the no-load condition thereof producing an unbalance force of given force value in said coupling means, force means of predetermined force value removably connected to the coupling means and effective to increase said unbalance force to a predetermined total unbalance force value, said counter-balance indicator mechanism being adapted and affording the sole means for counter-balancing said total unbalance force value in the no-load indicating condition of the mechanism, and operable responsively to loads on the lever system to indicate load weights up to a predetermined maximum weight value defining the initial capacity limit of the weighing apparatus, control means operable for removing the force means from connection to the coupling means, thereby conditioning said counter-balancing indicator mechanism for weight indication upon application of loads to the lever system in a range above said initial capacity limit, and an indicator effective upon removal of the force means from connection to the coupling means, to indicate a weight value which in summation with the weight indication of the mechanism provides the indication of the load weight on the lever system.

3. In weighing scale apparatus, a load responsive lever system, a counter-balance indicator mechanism, means including a load rod operatively coupling said mechanism and lever system, the lever system being adapted and arranged in the no-load condition thereof to impose a first unbalance force on said rod, an abutment on said rod, a weight element normally removably supported on said abutment and imposing a second unbalance force on the rod, said mechanism being adapted for counter-balancing the sum of said first and second unbalance forces in the no-load indicating condition of the mechanism absent a load on the lever system, and for indicating load weight on the lever system up to a predetermined maximum weight value defining the initial capacity limit of the scale apparatus, control means operable for removing said weight element from said rod abutment and supporting the element free of said rod abutment, and means actuated responsively to weight element removing operation of the control means, for indicating said initial capacity maximum weight value, the counter-balance indicator mechanism being operable upon removal of said weight element from the rod abutment and application to the lever system of load weights in a predetermined weight range above said initial capacity limit weight value, for indicating the excess of load weight values over said initial capacity limit weight value.

4. In weighing scale apparatus having a load responsive lever system, a counter-balance indicator mechanism and coupling means connecting the mechanism to the lever system, said lever system in the no-load condition thereof producing an unbalance force of given force value in said coupling means, separate force means removably connected to said coupling means and effective to increase said unbalance force to a predetermined total unbalance force value, said mechanism being adapted and affording the sole means for counter-balancing said total unbalance force value in the no-load condition of the lever system and indicating zero load weight, and operable upon loading of the lever system to indicate the load weight values thereof up to a predetermined initial maximum load weight, said separate force means having a force value equal to the counter-balancing force of said mechanism in counter-balancing the lever system under a load having a weight equal to said initial maximum load weight, and means operable for removing said separate force means from connection to said coupling means, thereby conditioning said mechanism for counter-balancing lever system loads in excess of said initial maximum weight up to twice the weight value of the latter and to indicate the load weight values in excess of said initial maximum load weight.

5. In weighing apparatus providing a load responsive lever system, a counter-balance indicator mechanism and means including a load rod operatively coupling the mechanism and lever system, said lever system being adapted and arranged to produce in the no-load condition thereof an unbalance force on the load rod, an abutment on said rod, a weight element encircling the rod and normally supported on the abutment thereby imposing a second unbalance force on the rod, said mechanism counter-balancing the sum of said first and second unbalance forces in the no-load condition of the lever system and indicating zero-load on the lever system, and being operative to indicate load weight on the lever system up to a predetermined weight value defining the base capacity of the weighting apparatus, said weight element having a predetermined weight value such as to establish said second unbalance force imposed by the weight element on the load rod at a force value equal to that unbalance force which would be imposed on the rod by the lever system under a reference load of a weight value in predetermined proportion to the base capacity weight value, the aforesaid mechanism further being operative upon removal of the weight element from support on said rod abutment and loading of the lever system in a range between said reference load weight and a predetermined maximum load weight greater than said base capacity weight, to indicate the portion of the load weight on the lever system which is in excess of the reference load weight, and means for controlling application and removal of said weight element relative to said rod abutment.

6. In weighing apparatus according to claim 5 further characterized by an indicator operated by the last said means in operation to remove the said weight element from support on the said rod abutment, to indicate the weight value of the said reference load.

7. In weighing apparatus providing a frame, a load responsive lever system carried by the frame, a support on the frame, a dial head swivelly mounted on the support, counter-balance indicator mechanism in said dial head, means including a load rod connected to said mechanism operatively coupling the mechanism and lever system, the lever system in the no-load condition thereof producing an unbalance force on said rod, force means removably supported by said rod and increasing said unbalance force to a predetermined force value, said mechanism counter-balancing said force value in the no-load condition of the lever system and indicating zero load on the lever system, the mechanism being operative to indicate load weight on the lever system up to a predetermined initial maximum defining the base capacity limit of the apparatus, and control means carried by said swivelly mounted dial head and operable for removing said force means from support by said rod, thereby to condition the mechanism for weight indication in lever system loading in a range above said base capacity limit.

8. In weighing apparatus providing a frame, a load responsive lever system carried by the frame, a support on the frame, a dial head swivelly mounted on the support, counter-balance indicator mechanism in said dial head, means including a load rod connected to said mechanism operatively coupling the mechanism and lever system, said lever system being adapted and arranged to produce in the no-load condition thereof an unbalance force on the load rod, an abutment on said rod, a weight element encircling the rod and normally supported on the abutment thereby imposing a second unbalance force on the rod, said mechanism counter-balancing the sum of said first and second unbalance forces in the no-load condition of the lever system and indicating zero-load on the lever system, and being operative to indicate load weight on the lever system up to a predetermined weight value defining the base capacity of the weighing apparatus, said weight element having a predetermined weight value such as to establish said second unbalance force imposed by the weight element on the load rod at a force value equal to that unbalance force which would be imposed on the rod by the lever system under a reference load of a weight value in predetermined proportion to the base capacity weight value, the aforesaid mechanism further being operative upon removal of the weight element from support on said rod abutment and loading of the lever system in a range between said reference load weight and a maximum load weight not exceeding the sum of the reference load weight and the base capacity weight, to indicate the portion of the load weight on the lever system which is in excess of the reference load weight, control means carried by said swivelly mounted dial head and operable for removing said weight element from support on said rod abutment, thereby to condition said mechanism for indicating the portion of the load weight on the lever system which is in excess of the reference load weight, and an indicator operated by said control means in operation to remove said weight element from the rod abutment, to indicate the weight value of said reference load.

References Cited by the Examiner
UNITED STATES PATENTS

| | | | |
|---|---|---|---|
| 1,012,522 | 12/1911 | Conant | 177—248 |
| 1,511,490 | 10/1924 | Ashcraft | 177—248 X |
| 1,596,547 | 8/1926 | Osgood et al. | 177—176 |
| 1,600,169 | 9/1926 | Hem | 177—205 X |
| 1,663,129 | 3/1928 | Hopkinson | 177—1 |
| 1,665,722 | 4/1928 | Timson | 177—248 |
| 1,885,356 | 11/1932 | Karrer | 177—1 |
| 2,074,005 | 3/1937 | Von Pein et al. | 177—205 |
| 2,851,262 | 9/1958 | Hoffmans | 177—176 |
| 2,864,606 | 12/1958 | Bradley et al. | 177—248 X |
| 2,946,580 | 7/1960 | Hensley | 177—248 |

LEO SMILOW, *Primary Examiner.*

G. J. PORTER, *Assistant Examiner.*